(12) United States Patent
Wachenschwan et al.

(10) Patent No.: US 11,826,934 B2
(45) Date of Patent: Nov. 28, 2023

(54) METHOD FOR BACK-MOLDING COLD-SHAPED GLASS COMPONENTS USING PLASTIC

(71) Applicant: Volkswagen Aktiengesellschaft, Wolfsburg (DE)

(72) Inventors: Volker Wachenschwan, Schoeppenstedt (DE); Christine Schuetz, Braunschweig (DE); Wilma Dewald, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 149 days.

(21) Appl. No.: 17/490,940

(22) Filed: Sep. 30, 2021

(65) Prior Publication Data
US 2022/0016815 A1    Jan. 20, 2022

Related U.S. Application Data

(63) Continuation of application No. PCT/EP2020/052925, filed on Feb. 6, 2020.

(30) Foreign Application Priority Data

Apr. 1, 2019   (DE) .................... 10 2019 204 582.0

(51) Int. Cl.
*B29C 45/14*    (2006.01)
*B29K 709/08*   (2006.01)

(52) U.S. Cl.
CPC .. *B29C 45/14434* (2013.01); *B29C 45/14221* (2013.01); *B29C 45/14262* (2013.01); *B29K 2709/08* (2013.01)

(58) Field of Classification Search
CPC ................. B29C 45/14434; B29C 45/14221
See application file for complete search history.

(56) References Cited

U.S. PATENT DOCUMENTS

5,061,429 A * 10/1991 Yoshihara ........... B29C 33/0044
                                                         425/117
5,196,210 A *  3/1993 Yoshihara ........... B29C 33/0044
                                                          249/95

(Continued)

FOREIGN PATENT DOCUMENTS

DE    102013211233 A1   12/2014
DE    102013221064 A1    4/2015
(Continued)

OTHER PUBLICATIONS

International Search Report dated Apr. 6, 2020 in corresponding application PCT/EP2020/052925.

*Primary Examiner* — Edmund H Lee
(74) *Attorney, Agent, or Firm* — Muncy, Geissler, Olds & Lowe, P.C.

(57) ABSTRACT

A method for continuously molding glass components with the aid of at least one plastic, at least one unshaped glass component being positioned between a first molding tool and a second molding tool, the at least one unshaped glass component being elastically shaped by pressing together the first molding tool and the second molding tool, the at least one elastically shaped glass component being secured in the shaped state by locking slides, and a plastic being applied to at least one side of the shaped glass component at least in areas.

14 Claims, 5 Drawing Sheets

(56) References Cited

U.S. PATENT DOCUMENTS

| | | |
|---|---|---|
| 10,381,718 B2 | 8/2019 | Geise |
| 10,629,984 B2 | 4/2020 | Geise |
| 10,688,700 B2 | 6/2020 | Faik et al. |
| 2018/0178424 A1* | 6/2018 | Faik .................... B29C 45/2606 |
| 2018/0339505 A1 | 11/2018 | Garner |
| 2019/0329531 A1 | 10/2019 | Brennan et al. |
| 2020/0398539 A1 | 12/2020 | Brennan et al. |

FOREIGN PATENT DOCUMENTS

| | | |
|---|---|---|
| DE | 102014019661 A1 | 6/2016 |
| EP | 3338987 A1 | 6/2018 |
| EP | 3452261 A1 | 3/2019 |
| WO | WO2018005646 A1 | 1/2018 |

\* cited by examiner

METHOD FOR BACK-MOLDING COLD-SHAPED GLASS COMPONENTS USING PLASTIC

This nonprovisional application is a continuation of International Application No. PCT/EP2020/052925, which was filed on Feb. 6, 2020, and which claims priority to German Patent Application No. 10 2019 204 582.0, which was filed in Germany on Apr. 1, 2019, and which are both herein incorporated by reference.

BACKGROUND OF THE INVENTION

Field of the Invention

The present invention relates to a method for permanently molding glass components with the aid of at least one plastic.

Description of the Background Art

Thin glass components may be used to manufacture innovative surfaces, for example in an interior of vehicles. Decorative surfaces may be produced with the aid of glass components of this type, into which functional elements may be integrated, for example touch sensors, lighting elements and displays.

It is technologically possible today to hot-form glass components and place them into a three-dimensional mold. However, this process is cost-intensive, since a great quantity of heat is needed for shaping the glass components. In vehicle interiors, however, these glass components have the disadvantage that they break during an accident, and further measures must be taken to protect the passengers.

Thin glass components, which may be shaped in the cold state, may be used as an alternative to thick glass components. Thin glass components of this type, which have a thickness of less than 250 µm, have a low heat capacity and may thus quickly cool and break during the bending process. As a result, only slow isothermal bending methods may be primarily used for glass components of a thin design.

At present, display applications using glass components usually have only flat geometries so as to not have to shape the glass components. For bent geometries, thicker glass is hot-shaped and then glued to other material and structural components. Glasses in the decile range, so-called ultra-thin glass, are cold-shaped and then clamped, glued and installed in frames and other devices.

In the known methods, the sequential manufacturing process is problematic. The ultra-thin glass is usually glued to an existing structural element as the last step, since the glass component itself has only a low inherent mechanical stability. The glass component must be held in a mold until the adhesive is cured. These processes have relatively long cycle times, whereby structural elements including glass components of this type may not be manufactured in larger quantities.

SUMMARY OF THE INVENTION

It is therefore an object of the present invention to provide a method of the type mentioned at the outset, with the aid of which thin glass components may be quickly and efficiently molded.

According to an aspect, the invention relates to a method for permanently molding glass components with the aid of at least one plastic. In one step, at least one unshaped glass component is provided and positioned between a first molding tool and a second molding tool.

The at least one unshaped glass component is subsequently elastically shaped by pressing together the first molding tool and the second molding tool. The elastic shaping of the glass component may preferably take place without introducing heat, i.e., in a cold manner.

In a further step, the at least one elastically shaped glass component is secured in the shaped state with the aid of locking slides. In the secured state, a plastic is subsequently applied to at least one side of the shaped glass component, at least in areas.

Since the shaped glass component is secured by the locking slides, for example a tool change may be carried out at this point in the method, or further processing steps may be carried out, such as cleaning, pretreatment or coating. At least two locking slides, which support the shaped glass component on at least two opposite edges, may be used to secure the shaped glass component. For this purpose, the glass component may be pressed, for example, into a cylindrical mold and be held, clamped in the cylindrical mold, by two locking slides arranged on the edge side.

The method allows structural elements including thin glass components to be manufactured, which have a reduced weight and a uniaxial flexibility. In particular, 2.5 D geometries, such as cylindrical shapes and S and V shapes, may be cold-shaped and manufactured in a mass-producible process in the form of structural elements.

Based on the method, glass components may be clamped or molded in molds and subsequently back-molded, at least in areas, using at least one plastic. A dimensional stability of the of finished structural element including the glass component is ensured by the application and subsequent solidification of the plastic. Functional parts or also decorative parts may be manufactured hereby, for example ornamental elements.

Moreover, the method according to the invention enables a high molding accuracy as well as a greater stability when introducing the plastic component, due to the mechanical stabilization of the shaped glass component by the molding tools. The molding tools and the locking slides may also reliably handle larger thin glass components and thus permit a cost-reduced processing of cold-bent thin glasses in large series.

The at least one unshaped glass component can be provided as an ultra-thin glass. Further, the plastic can be applied by the first molding tool to the at least one shaped glass component, while the at least one shaped glass component is supported by the second molding tool. For this purpose, the first molding tool may be designed, for example, as an injection molding tool and have recesses and impressions, which the plastic component solidified on the shaped glass component is to have. Moreover, the first molding tool may have corresponding conduits for supplying a liquefied plastic, to fill the recesses and impressions with the liquefied plastic as well as to bond with the glass component.

The cold shaping of the glass component as well as the back-molding of the shaped glass component may be implemented hereby in one process step. This embodiment may be used, for example, in semicircular or cylindrically shaped glass components, the at least one plastic being able to be applied to an outer contour of the glass component. The outer contour of the shaped glass component corresponds, for example, to an outer lateral surface.

At least one molding tool can form a combination of a molding die and an injection mold.

The at least one glass component may be particularly flexibly processed if, after the at least one shaped glass component is secured by the locking slides, the second molding tool is spaced a distance apart from the at least one shaped glass component, and a third molding tool for applying the plastic is arranged on a side of the at least one shaped glass component opposite the first molding tool. By securing the glass component with the aid of the locking slides, the glass component may be locked on the first molding tool. As a result, the shaped glass component retains its elastically cold-shaped form on the first molding tool. This locked state permits further processing steps of the shaped glass component, for example changing the molding tools, applying coatings, carrying out cleaning steps and the like.

A die can be used as the first molding tool and a stamp for elastically shaping the glass component is used as the second molding tool. The first molding tool and/or the third molding tool is/are preferably connected to at least one application unit for applying the plastic to the at least one shaped glass component. The application unit may be, for example, a direct connection of an extruder of an injection molding device or a corresponding conduit for supplying at least one plastic. The application unit and/or the conduits between the molding tool and the application unit may preferably be heatable. The first and/or the third molding tool may also be heatable to enable a uniform distribution of the supplied plastic.

The glass component may be permanently stabilized quickly and efficiently in the elastically shaped state, if the plastic is applied to the at least one shaped glass component by an injection molding process. By using an injection molding process, the back-molding of the glass component using plastic may be automated and manufactured, for example, in mass production. A structural element made up of the at least one shaped glass component as well as at least one plastic may be manufactured by the method particularly quickly and cost-efficiently.

The at least one glass component may be cold-shaped in a material-saving manner if the second molding tool has elastic material properties. For example, the second molding tool may be designed as a stamp having an elastic contact surface with respect to the glass component. Tension peaks in the shaping of the glass component may be prevented hereby.

The at least one glass component can be pretreated or coated to improve adherence properties. For example, the glass component may be coated with an adherence-promoting agent to improve the adherence of the plastic. Alternatively or additionally, the glass component may be chemically roughened or etched to obtain an optimal bonding to the plastic. In this step, decorative coatings may also be applied, such as paints or films, and or functional coatings, for example electrical leads. The coating may be applied to the shaped or unshaped glass component by vapor deposition, spraying, screen printing and the like.

The at least one shaped glass component can be held in a shaped state by at least one transverse clamping device and/or the locking slides. The locking slides may be used, for example, to fix geometrically simple shaped glass components in the shaped state. A shape of this type may be semicircular or bent, in which the bend is held by the locking slides. The locking slides may be arranged along at least two opposite edges of the glass component. In the case of large glass components and complex shapes, the use of additional transverse clamping devices may be necessary to fix the shape of the glass component. The transverse clamping devices may act upon the glass component at least in sections. The transverse clamping devices may preferably be positioned in a form-fitting manner at the edges of the shaped glass component in areas between the locking slides. The transverse clamping devices may be arranged, for example, along a bending axis of the shaped glass component and hold down the shaped glass component against the first molding tool. The at least one shaped glass component, which is provided, for example, with a rectangular design, may be locked hereby on the first molding tool at all edges by at least one locking slide and/or one transverse clamping device.

The at least one shaped glass component may be bonded to at least one plastic completely or without edges if the at least one transverse clamping device and/or the locking slides is/are repositioned during a bending operation of the at least one glass component or is/are removed from the at least one shaped glass component. The transverse clamping devices and/or the locking slides may be withdrawn hereby during the injection molding process for the purpose of fully back-molding the glass component.

The transverse clamping devices and the locking slides may be versatilely controlled if the detachment and/or application of the at least one transverse clamping device and/or the locking slides from and/or to the at least one glass component is/are carried out hydraulically, pneumatically, electrically or mechanically. The transverse clamping devices as well as the locking slides may be connected hereby to existing hydraulic, pneumatic or electrical lines. At least one pressure sensor may be used to generate signals for a withdrawal torque of the transverse clamping devices and/or the locking slides.

The withdrawal of the transverse clamping devices and/or the locking slides may can take place, for example, via a spreading flow front. The flow front or the spreading plastic may displace the transverse clamping devices as well as the locking slides into their end stop position.

Depending on the application, the transverse clamping devices and/or the locking slides may also be withdrawn by a positioning of the second molding tool or the third molding tool at the preshaped glass component. The additional locking of the shaped glass component may be omitted, since the shape of the glass component is ensured by the molding tools arranged on both sides. The removal of the transverse clamping devices and/or the locking slides from the glass component may be initiated by a pressure sensor, which detects a predefined contact pressure of the molding tools onto the glass component. A complete back-molding or overmolding of the cold-shaped glass component may be facilitated by the removal of the transverse clamping devices and/or the locking slides. In the case of the back-molding of the glass component, at least one planar side of the shaped glass component is covered by the plastic at least in areas. In the case of an overmolding of the shaped glass component, the at least one plastic is also applied to the edge sides of the shaped glass component, the plastic also being able to be applied to both sides of the shaped glass component.

A structural element manufactured by the method can be provided. The structural element includes at least one shaped glass component and at least one plastic, which is bonded to the shaped glass component at least in areas. The plastic follows the uneven shaping of the shaped glass component and stabilizes the glass component in the particular mold.

Functional or decorative structural elements may be manufactured hereby, which may be used, for example, for displays in the vehicle interior, back-lit elements in the vehicle outer area, B pillars, laser scanners, sensors, decorative class-A surfaces and the like. However, the method is not limited to vehicle manufacturing but may also be used in other technical fields, such as in the manufacture of white goods, switch covers, electronic devices, infotainment and the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
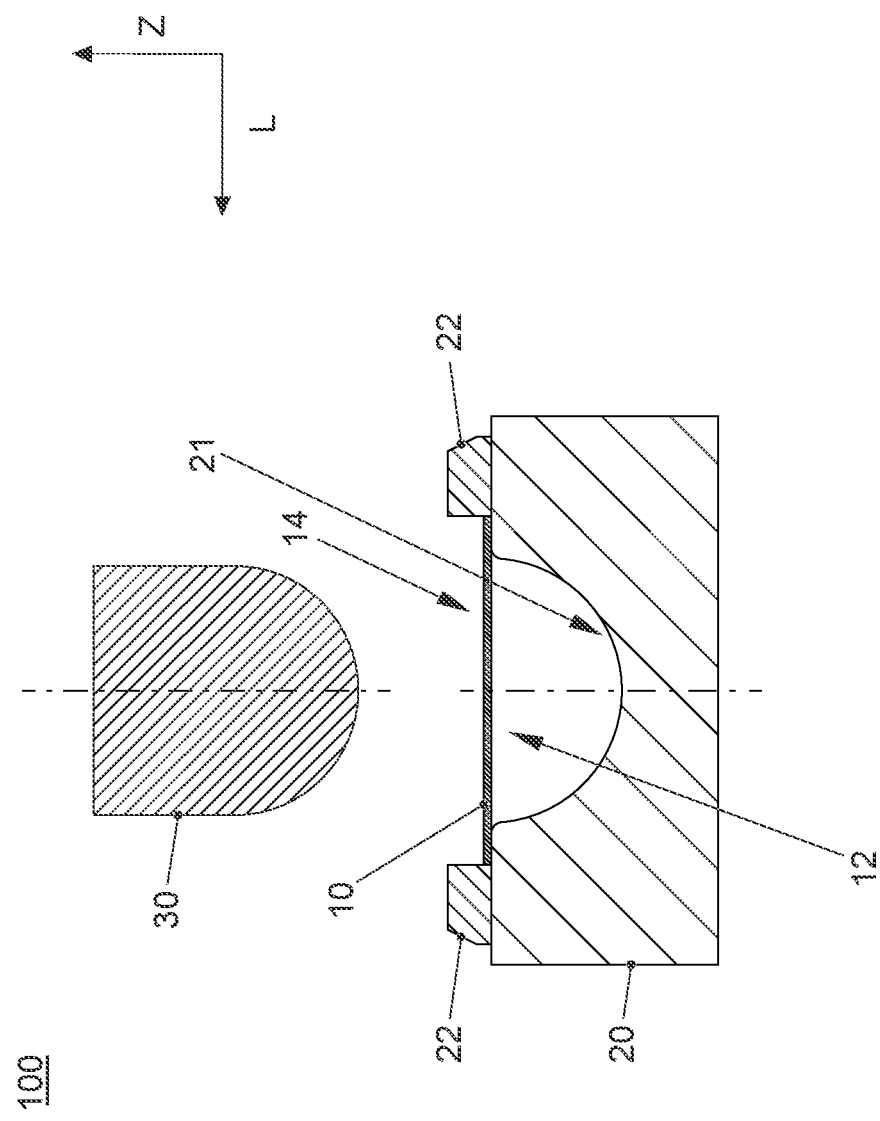
FIG. 1 shows a schematic representation of an arrangement for shaping a glass component.

FIG. 1 shows a schematic representation of an arrangement 100 for shaping a glass component 10. Arrangement 100 includes a first molding tool 20 and a second molding tool 30.

First molding tool 20 is designed as a so-called die, which has a semicircular cavity 21. Locking slides 22 are arranged in a longitudinal direction L on the sides of cavity 21.

Locking slides 22 are designed to be movable in longitudinal direction L. Locking slides 22 may be actuated, for example, hydraulically, electrically or pneumatically. In particular, locking slides 22 may be moved in the direction of cavity 21.

Glass component 10 to be shaped is arranged between locking slides 22. Locking slides 22 may be additionally used as positioning aids for the correct alignment of glass component 10 relative to cavity 21.

Second molding tool 30 is designed as a stamp. According to the exemplary embodiment, second molding tool 30 is designed as an elastic stamp, which is movable in height direction Z. Second molding tool 30 has a mold, which is insertable with a glass component 10 into cavity 21 in a form-fitting manner.

Figure 2B:
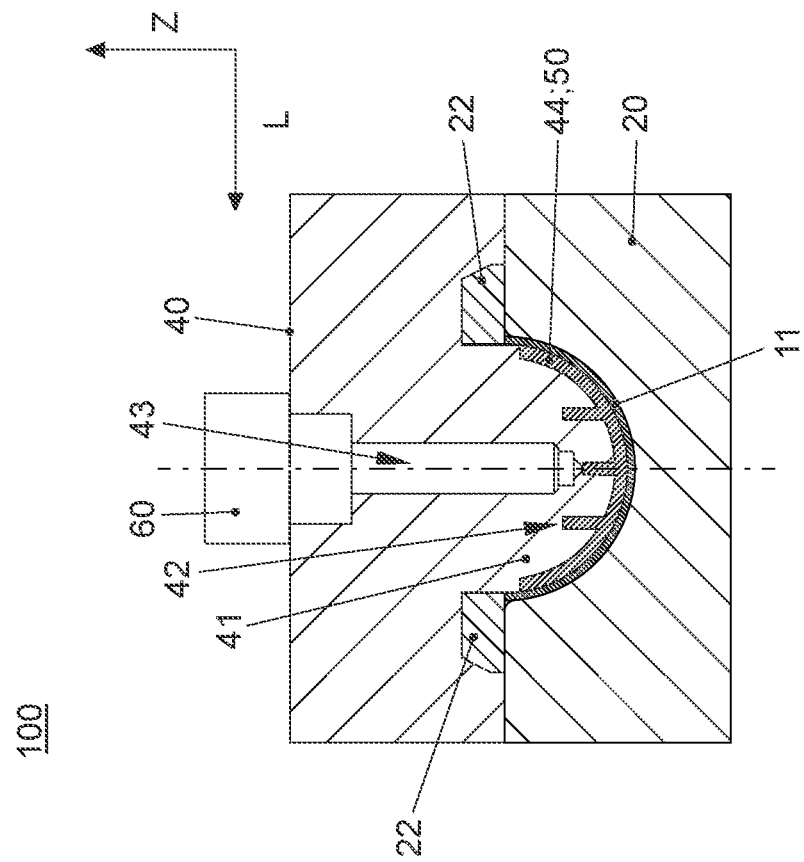
FIGS. 2a and 2b show schematic representations of the arrangement for carrying out a method.
Figure 2A:
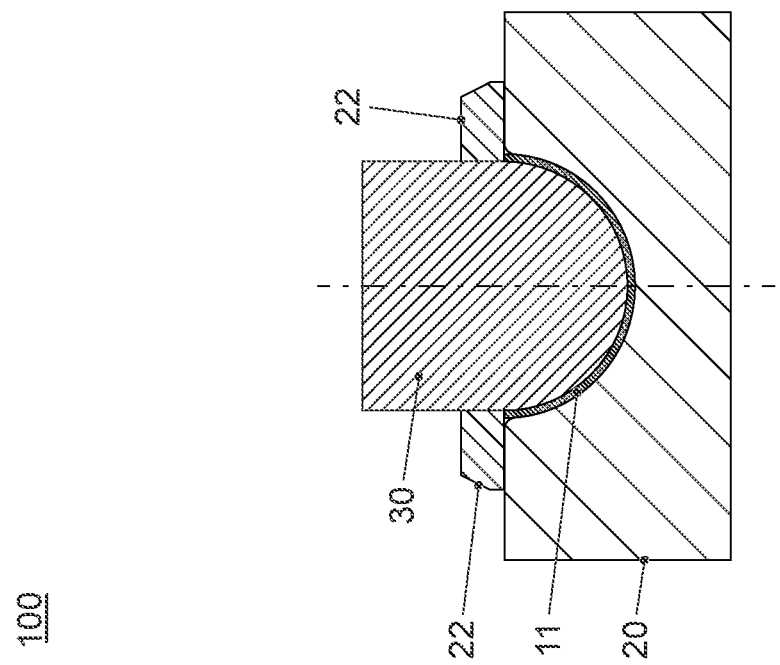

FIG. 2a and FIG. 2b show schematic representations of arrangement 100 for carrying out a method according to an exemplary embodiment; Arrangement 100 from FIG. 1 is illustrated in FIG. 2a, in which second molding tool 30 was pressed into cavity 21.

After second molding tool 30 was pressed into cavity 21, an arrangement of locking slides 22 against second molding tool 30 in longitudinal direction L takes place. Locking slides 22 overlap cold-shaped glass component 11 between first molding tool 20 and second molding tool 30 and prevent a removal of shaped glass component 11 from the mold. Locking slides 22 optimally follow the contour of glass component 10 during the bending of unshaped glass component 10 by second molding tool 30.

In a further step of the method, first molding tool 20 is moved together with shaped glass component 11 fixed by locking slides 22 to a third molding tool 40, which is shown in FIG. 2b. This may take place, for example, via a rotating plate, which is not illustrated, on which first molding tool 20 may be positioned.

Third molding tool 40 is designed as an injection molding tool and includes a stamp 41 with additional cavities 42. Cavities 42 form an impression of a plastic component 50 to be cast. Third molding tool 40 is illustrated pressed against shaped glass component 11. Cavity 42 forms a volume 44, which is limited by shaped glass component 11.

A liquefied plastic may be introduced into cavity 42 via a plastic supply conduit 43. Plastic supply conduit 43 is connected, for example, to an extruder of an injection molding device as an application unit 60. The liquefied plastic is introduced into volume 44 and may harden in volume 44 into a plastic component 50, which is bonded to shaped glass component 11 at least in areas.

Filled or unfilled thermosetting plastics or thermoplastics, elastomers and the like may be used as plastic. The plastic may also be applied to volume 44 by foam injection molding. The plastic may be chemically or physically foamed.

The adherence between shaped glass component 11 and plastic component 50 may be generated via adherence-optimized coatings, activation of the glass surface of shaped glass component 11 or via an adherence-promoting agent. Moreover, a shaped glass component 11 may be used, which is already coated or is provided, for example, with a screen printing. To protect shaped glass component 11 or a coating, a protective film may be arranged on glass component 10 on side 12 facing away from the injection mold. Plastic 50 is applied on a side 14 of glass component 10, 11 facing plastic 50.

Figure 3B:
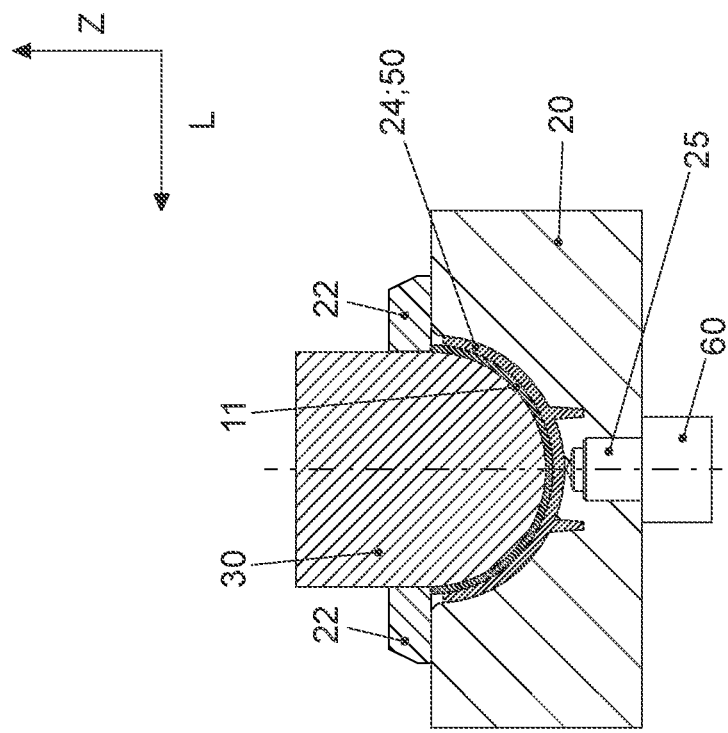
FIGS. 3a and 3b show schematic representations of a further arrangement for carrying out a method.
Figure 3A:
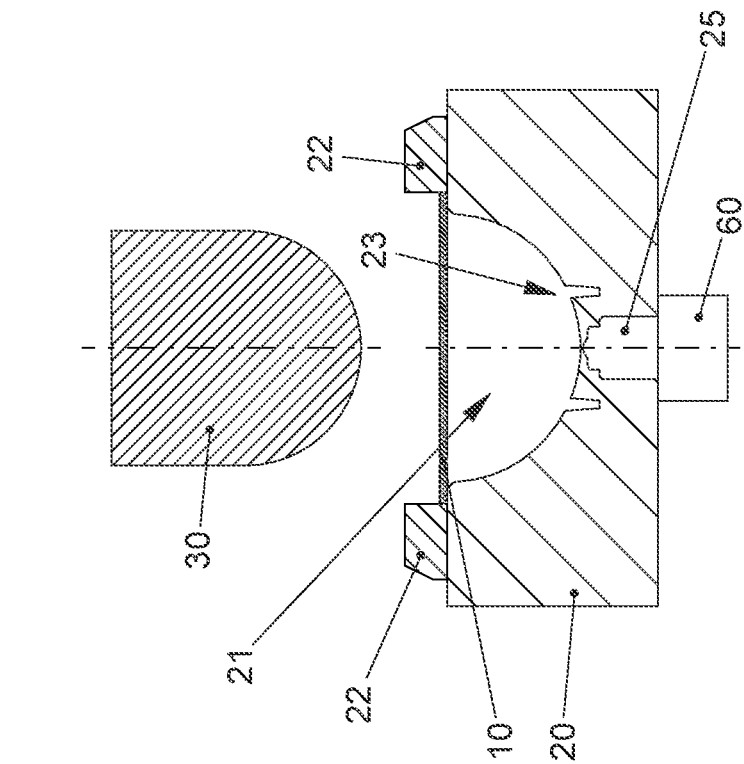

FIG. 3a and FIG. 3b show schematic representations of a further arrangement 110 for carrying out a method according to an exemplary embodiment. In contrast to arrangement 100 already illustrated, the shaping of glass component 10 as well as the introduction of the plastic take place in one step or without a changing of molding tools 30, 40.

According to the exemplary embodiment, first molding tool 20 has not only a cavity 21 for molding glass component 10 but also a further cavity 23 for forming plastic component 50. The two cavities 21, 23 merge seamlessly with each other. Second molding tool 30 is moved in height direction Z in such a way that glass component 10 is shaped, and a volume 24 for forming plastic component 50 is set between cavity 23 and shaped glass component 11.

FIG. 3b shows a step of the method, in which second molding tool 30 was inserted into cavity 21 of first molding tool 20, and plastic was applied to volume 24 for forming plastic component 50. Similarly to third molding too 40, first molding tool 20 according to the exemplary embodiment has a plastic supply conduit 25. Plastic supply conduit 25 is connected to an application unit 60, which may introduce a liquefied plastic into volume 24 via plastic supply conduit 25.

Figure 4:
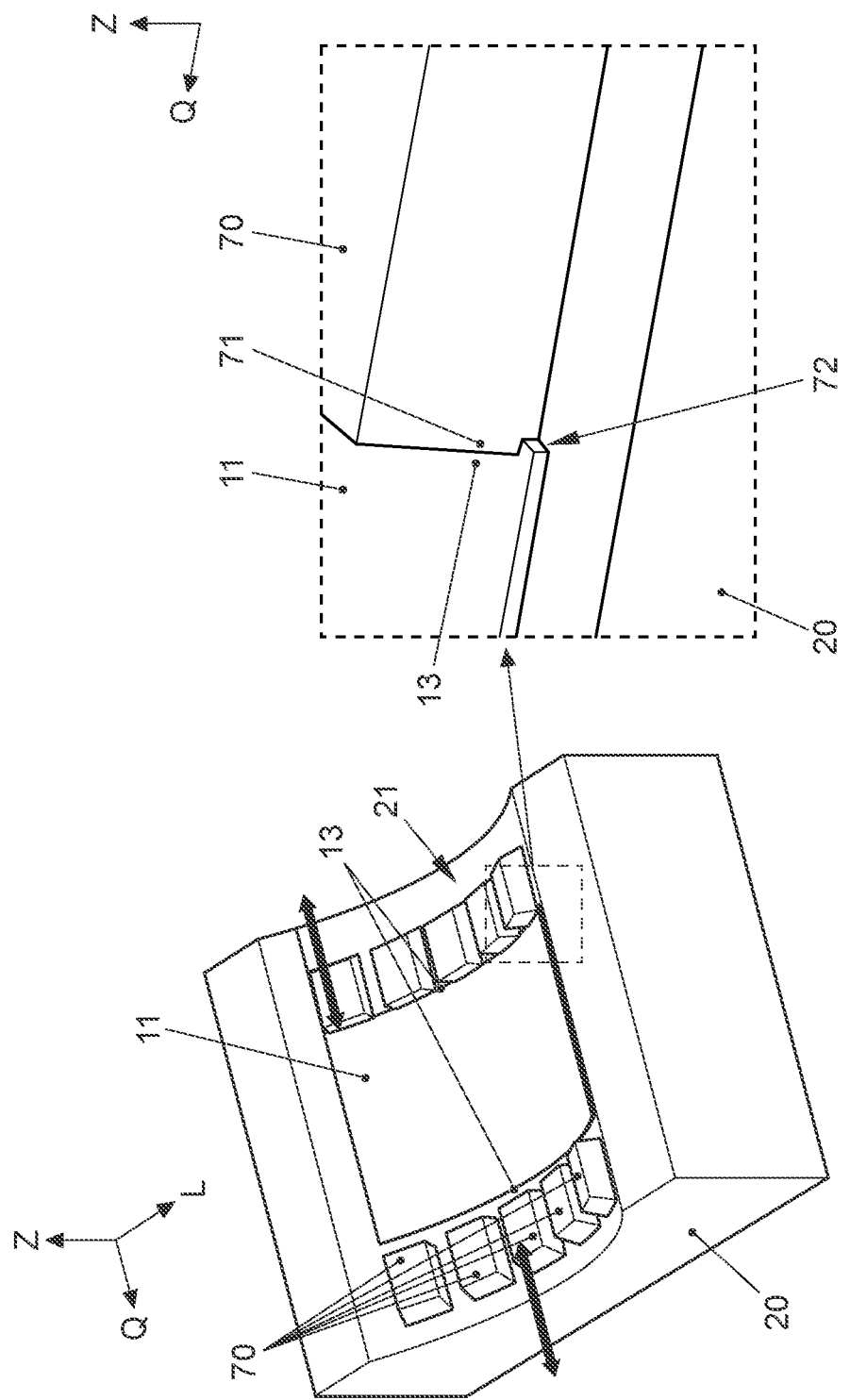
FIG. 4 shows a perspective representation of a first molding tool.

FIG. 4 shows a perspective representation of first molding tool 20 according to an exemplary embodiment. Glass component 11 is arranged in a shaped state in cavity 21 of first molding tool 20. Shaped glass component 11 is fixed in the shaped state by transverse slide devices 70.

In the case of small bending radii, in particular, locking slides 22 must terminate precisely with the edge of the glass component, since the latter may otherwise jump out of cavity 21. The force increases on an edge or boundary 13 of shaped glass component 11. Transverse clamping devices 70 may be used here along edges 13 for holding down shaped glass component 11. Shaped glass component 11 may be uniformed fixed in a material-saving manner by transverse clamping devices 70. According to the exemplary embodiment, five transverse clamping devices 70 may be positioned in transverse direction Q at edges 13 of shaped glass component 11. Transverse clamping devices 70 may be moved in transverse direction Q. The arrows illustrate the movement possibilities of transverse clamping devices 70.

In order for transverse clamping devices 70 to optimally lock shaped class component 11, they have a projection 71, which is oriented toward shaped glass component 11. Projection 71 of transverse clamping devices 70 forms guide slots 72, in which shaped glass component 11 is arranged. Each guide slot 72 is formed between first molding tool 20 and particular projection 71.

Figure 5:
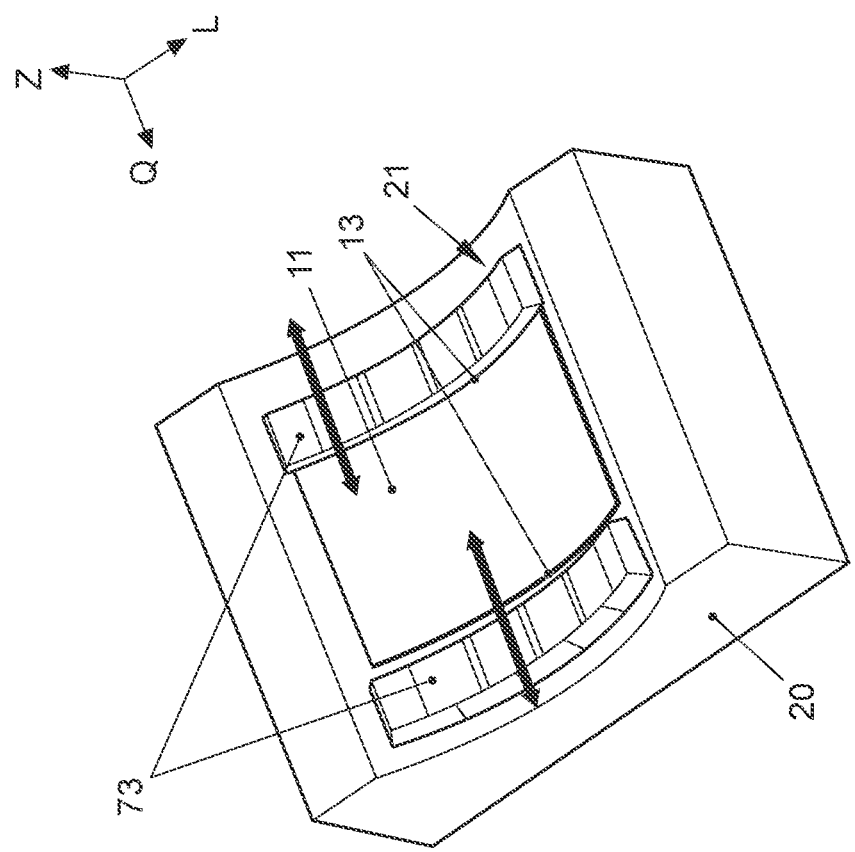
FIG. 5 shows a perspective representation of the first molding tool.

FIG. 5 shows a perspective representation of first molding tool 20 according to an exemplary embodiment. In contrast to exemplary embodiment illustrated in FIG. 4, transverse clamping devices 73 are provided with a one-part design and extend essentially along the entire extension of shaped glass component 11 in longitudinal direction L.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for permanently molding glass components with the aid of at least one plastic, the method comprising:
   positioning at least one unshaped glass component between a first molding tool and a second molding tool;
   subsequently elastically shaping the at least one unshaped glass component into at least one shaped glass component by pressing together the first molding tool and the second molding tool;
   after the at least one unshaped glass component is shaped into the at least one shaped glass component by pressing together the first molding tool and the second molding tool, locking slides are slid towards the second molding tool, so as to cover edges of the at least one shaped glass component to secure the at least one shaped glass component in the first molding tool in a shaped state; and
   applying a plastic to at least one side of the secured at least one shaped glass component at least in areas.

2. The method according to claim 1, wherein the at least one unshaped glass component is provided as an ultra-thin glass, and wherein the plastic is applied by the first molding tool to the secured at least one shaped glass component while the at least one shaped glass component is supported by the second molding tool.

3. The method according to claim 2, wherein a die is used as the first molding tool and a stamp for elastically shaping the at least one unshaped glass component is used as the second molding tool, the first molding tool being connected to at least one application unit for applying the plastic to the at least one shaped glass component.

4. The method according to claim 2, wherein the first molding tool has a cavity into which the unshaped glass component is pressed during shaping, and wherein a plastic supply conduit extends through the first molding tool and opens into the cavity of the first molding tool to apply the plastic to the at least one shaped glass component.

5. The method according to claim 1, wherein, after the at least one shaped glass component is secured by the locking slides, the second molding tool is spaced a distance apart from the secured at least one shaped glass component, and a third molding tool for applying the plastic is arranged on a side of the secured at least one shaped glass component opposite the first molding tool.

6. The method according to claim 5, wherein a die is used as the first molding tool and a stamp for elastically shaping the glass component is used as the second molding tool, the third molding tool being connected to at least one application unit for applying the plastic to the secured at least one shaped glass component.

7. The method according to claim 1, wherein the plastic is applied by an injection molding process to the at least one shaped glass component.

8. The method according to claim 1, wherein the second molding tool has elastic material properties.

9. The method according to claim 1, wherein the at least one unshaped glass component is pretreated or coated to improve adherence properties.

10. The method according to claim 1, wherein the at least one shaped glass component is additionally held in the shaped state in the first molding tool by at least one transverse clamping device.

11. The method according to claim 10, wherein the at least one transverse clamping device and/or the locking slides is/are repositioned or removed from the at least one unshaped glass component during a bending operation of the at least one unshaped glass component.

12. The method according to claim 10, wherein movement of the at least one transverse clamping device and/or the locking slides is/are carried out hydraulically, pneumatically, electrically or mechanically.

13. The method according to claim 1, wherein when the at least one unshaped glass component is positioned between the first molding tool and the second molding tool, the at least one unshaped glass component extends in a first plane, and wherein after the at least one unshaped glass component is shaped into the at least one shaped glass component by pressing together the first molding tool and the second molding tool, the locking slides are slid towards the second molding tool in a direction parallel to the first plane.

14. The method according to claim 13, wherein the locking slides are attached to and slidable upon an upper surface of the first molding tool upon which the unshaped glass component is placed prior to being shaped into the shaped glass component.

* * * * *